(12) United States Patent
Jacob

(10) Patent No.: US 7,582,021 B2
(45) Date of Patent: Sep. 1, 2009

(54) LONGITUDINAL SHAFT

(75) Inventor: Werner Jacob, Frankfurt am Main (DE)

(73) Assignee: Shaft-Form-Engineering GmbH, Mühlheim am Main (DE)

( * ) Notice: Subject to any disclaimer, the term of this patent is extended or adjusted under 35 U.S.C. 154(b) by 28 days.

(21) Appl. No.: 10/524,391

(22) PCT Filed: Jul. 9, 2003

(86) PCT No.: PCT/EP03/07386

§ 371 (c)(1),
(2), (4) Date: Jul. 18, 2005

(87) PCT Pub. No.: WO2004/018247

PCT Pub. Date: Mar. 4, 2004

(65) Prior Publication Data

US 2006/0014587 A1   Jan. 19, 2006

(30) Foreign Application Priority Data

Aug. 14, 2002  (DE) ............................... 102 37 172

(51) Int. Cl.
*F16D 3/227* (2006.01)
(52) U.S. Cl. ................. 464/141; 464/146; 464/906
(58) Field of Classification Search ......... 464/144–146, 464/141, 906, 111, 905, 162, 167, 153, 154, 464/140; 180/233, 384; 74/493
See application file for complete search history.

(56) References Cited

U.S. PATENT DOCUMENTS 3,132,494 A * 5/1964 Hoffer ..................... 464/154

| | | | |
|---|---|---|---|
| 3,714,797 A | | 2/1973 | Fisher |
| 4,892,433 A | * | 1/1990 | Schreiber |
| 5,582,546 A | * | 12/1996 | Welschof ................ 464/141 |

(Continued)

FOREIGN PATENT DOCUMENTS

DE   38 28 018 A1   3/1989

(Continued)

OTHER PUBLICATIONS

"DOS—A new constant velocity joint for motor vehicle power train", published in 1978, Sonderdruck aus ATZ Automobiltechnische Zeitschrift 80 Jahrgang Nr. Nov. 1978 pp. 1-4.

(Continued)

*Primary Examiner*—Greg Binda
(74) *Attorney, Agent, or Firm*—Collard & Roe, P.C.

(57) ABSTRACT

A longitudinal shaft for use in particular in four-wheel drive or rear-wheel drive motor vehicles includes a gearbox-side articulation, a differential-side articulation, as well as a central articulation through which a gearbox-side section is integrally linked in rotation to a differential-side section of the longitudinal shaft. To reduce the centrifugal forces occurring at the longitudinal shaft 1 in operation, the gearbox-side articulation and the differential-side articulation have each an inner hub designed to connect the longitudinal shaft integrally in rotation respectively to a gearbox output shaft and to a differential input shaft, the longitudinal shaft being centered on the gearbox output shaft and the differential input shaft by interlocking through the inner hubs.

7 Claims, 2 Drawing Sheets

U.S. PATENT DOCUMENTS

| | | |
|---|---|---|
| 6,171,196 B1 | 1/2001 | Welschof |
| 6,241,617 B1 | 6/2001 | Jacob |
| 6,379,255 B1 | 4/2002 | Cermak et al. |

FOREIGN PATENT DOCUMENTS

| | | | |
|---|---|---|---|
| DE | 43 02 432 A1 | 8/1993 |
| DE | 43 17 606 C1 | 1/1995 |
| DE | 43 44 177 C1 | 2/1995 |
| DE | 196 52 100 C1 | 4/1998 |
| DE | 199 43 880 C1 | 6/2001 |
| DE | 102 15 657 A1 | 10/2003 |
| GB | 2277911 | 11/1994 |
| JP | 3-249430 | 11/1991 |
| JP | 5-178 106 A | 7/1993 |
| JP | 10-169635 A | 6/1998 |
| JP | 10-169666 A | 6/1998 |

OTHER PUBLICATIONS

Extract from the book Kunststoffe im Automobilbau-Integration nach Maβ, VDI-Verlag GmbH, Düsseldorf 1990 pp. 55-63.

International Search Report, for PCT/EP03/07386, mailed Nov. 4, 2003.

* cited by examiner

LONGITUDINAL SHAFT

CROSS REFERENCE TO RELATED APPLICATIONS

Applicant claims priority under 35 U.S.C. §119 of German Application No. 102 37 172.5 filed Aug. 14, 2002. Applicant also claims priority under 35 U.S.C. §365 of PCT/EP2003/007386 filed Jul. 9, 2003. The international application under PCT article 21 (2) was not published in English.

BACKGROUND OF THE INVENTION

1. Field of the Invention

The invention relates to a longitudinal shaft, particularly for use in automobiles having all-wheel drive or rear-wheel drive, comprising a gearbox-side articulation, a differential-side articulation, and a central articulation, each of which have an inner hub and an outer hub that surrounds the former at least in some regions, whereby two shaft segments are connected with one another so as to rotate together, by way of the central articulation. In this connection, the terms "gearbox-side" and "differential-side" are used merely as examples in the sense of this invention, to differentiate the two ends of the longitudinal shaft.

2. The Prior Art

In the case of automobiles, which usually have a motor with a transmission, installed in the front in the direction of travel, the drive torque of the engine is transferred to the rear axle differential for rear-wheel drive, by way of a longitudinal shaft disposed in the direction of travel. In this connection, the longitudinal shaft is subjected to stresses that are as high as ten times the rated torque, as the result of frequently changing torques and speeds of rotation, as well as load shocks. At the same time, the vibrations and noises produced by the longitudinal shaft are supposed to be kept as low as possible.

Usually, a longitudinal shaft of the type stated initially is attached to the transmission output shaft and the differential input shaft, respectively, by way of a flange connection with the outer rings of the gearbox-side articulation and of the differential-side articulation. This flange connection simultaneously serves to center the longitudinal shaft. However, in the case of the high speeds of rotation of the longitudinal shaft that frequently occur during operation, between 8,000 and 10,000 revolutions per minute, even slight balance errors of the longitudinal shaft resulting from insufficient centering will bring about great centripetal forces in the longitudinal shaft, which result in vibrations and disruptive noises.

SUMMARY OF THE INVENTION

It is therefore the task of the invention to make available a longitudinal shaft of the type stated initially, in which the centripetal forces that cause the vibrations and noises are reduced to the greatest possible extent.

This task is accomplished, according to the invention, in that the inner hubs of the gearbox-side articulation as well as of the differential-side articulation have a central bore provided with a plug-in tooth system, to connect the longitudinal shaft for integral rotation, and to center it, on journals of a gearbox output shaft and a differential input shaft, respectively. In this connection, the invention is based on the idea that the centering diameter of a plug-in connection between the inner hub of the gearbox-side articulation and of the differential-side articulation with the gearbox output shaft and the differential input shaft, respectively, which diameter is clearly smaller as compared with flange centering, allows a significant reduction in the unbalance of the longitudinal shaft, at the same quality of tolerance. In this manner, the centripetal forces caused by the unbalance are also reduced, thereby increasing the comfort of the vehicle, by means of lower vibrations and noises of the drive train. The connection between the gearbox output shaft and the differential input shaft by means of the longitudinal shaft takes place, in this connection, in that the profiled inner hub of the gearbox-side articulation of the longitudinal shaft is set onto a correspondingly profiled journal of the gearbox output shaft, and the inner hub of the differential-side articulation is pushed onto a journal of the differential input shaft. In this manner, not only is a connection between the gearbox output shaft and the differential input shaft that permits integral rotation produced, but also centering of the longitudinal shaft is achieved.

The centering of the two segments of the longitudinal shaft by way of the central articulation can be improved if the central articulation also has an inner hub having a central bore that is provided with a plug-in tooth system, which accommodates a corresponding journal of a shaft segment of the longitudinal shaft for plug-in centering for integral rotation. Here, the connection between the two segments of the longitudinal shaft in the central articulation takes place in essentially the same manner as the connection of the gearbox output shaft and the differential input shaft to the longitudinal shaft.

In a further development of the idea of the invention, it is provided that the two shaft segments of the longitudinal shaft are configured as shaft tubes, and the outer hubs of the gearbox-side articulation, the differential-side articulation, and the central articulation are shaped sheet-metal parts directly connected with the shaft tubes. The greatest possible use of shaped sheet-metal parts in the articulations of the longitudinal shaft, which are connected directly to the longitudinal shaft tubes by way of a weld seam, for example, reduce the overall weight of the longitudinal shaft. Minimization of the weight of the longitudinal shaft also contributes to reducing the centripetal forces that occur, along with the improved centering.

In the gearbox-side articulation, as well as in the central articulation, only very slight angles of inclination usually occur during operation, so that the use of a synchronous articulation in the gearbox-side articulation or the central articulation of the longitudinal shaft would not result in any clear improvement of the synchronicity properties. In order to achieve optimal efficiency of the longitudinal shaft according to the invention, it is therefore preferred to implement the gearbox-side articulation and/or the central articulation as a sliding articulation.

If the gearbox-side articulation and the central articulation are configured as sliding articulations and have a common installation/displacement path, which corresponds at least to a length such that the gearbox output shaft or the differential input shaft projects into the inner hub of the gearbox-side articulation or the differential-side articulation, respectively, in operation, the longitudinal shaft according to the invention can be installed in particularly simple manner, between the gearbox output shaft and the differential input shaft.

Since the angles of inclination during operation of the differential-side articulation of the longitudinal shaft usually lie in a range that lies clearly above those of the gearbox-side articulation and the central articulation, it is preferred, in order to improve the synchronicity properties, to configure the differential-side articulation as a synchronous articulation.

According to a preferred embodiment of the invention, the gearbox side shaft segment of the longitudinal shaft has a diameter that differs from that of the differential-side shaft segment, in such manner that the two shaft segments can be pushed onto one another in the manner of a telescope. With this embodiment of the longitudinal shaft, it is avoided that the longitudinal shaft will bend out when compressed end to end, for example as the result of an accident, and penetrate into the passenger compartment of the vehicle. Instead, if in-line compression occurs, the two shaft segments of the longitudinal shaft will move into one another in the manner of a telescope, so that danger to the passengers in the passenger compartment of the vehicle, resulting from the longitudinal shaft, is reduced.

BRIEF DESCRIPTION OF THE DRAWINGS

The invention will be explained in greater detail in the following on the basis of an exemplary embodiment, making reference to the drawing.

This shows.

Figure 1:
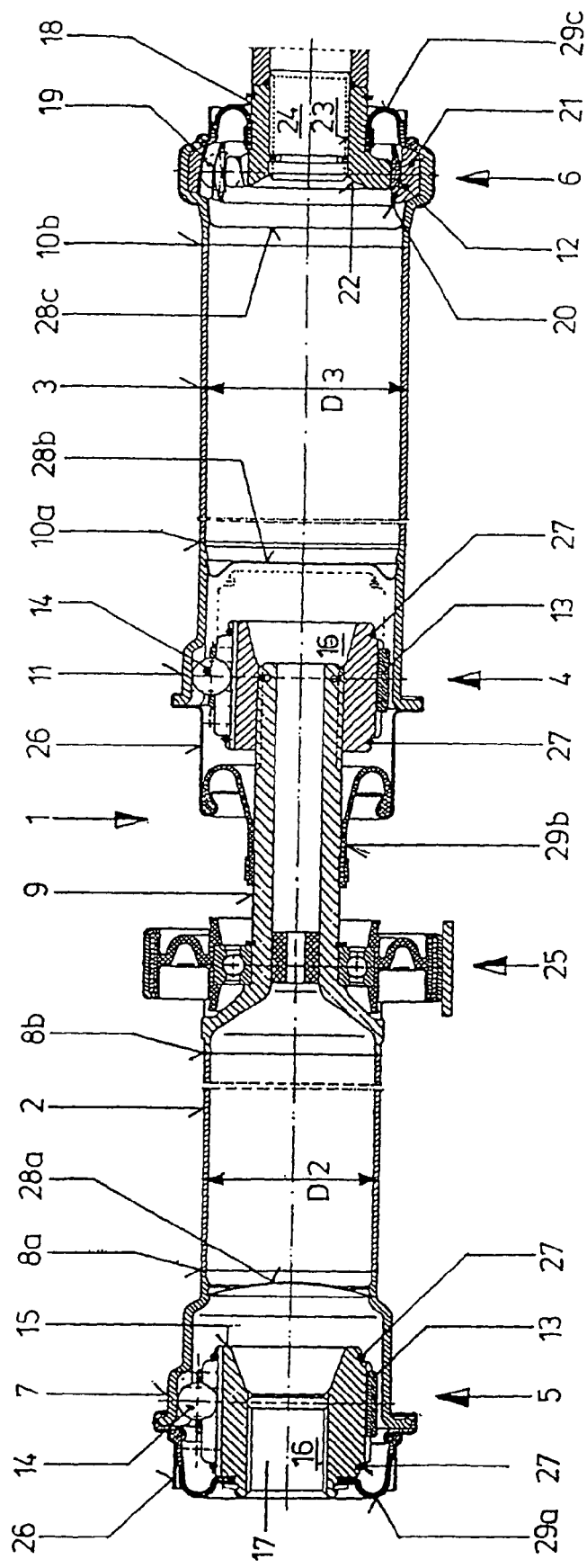
FIG. 1 a longitudinal shaft according to the invention, in cross-section.

The longitudinal shaft 1 shown in FIG. 1 has two shaft segments 2 and 3, configured as shaft tubes, which are connected with one another by means of a central articulation 4. The left end of the longitudinal shaft 1 in the figure is the gearbox side that is usually disposed at the front of a vehicle in the direction of travel, while the right end of the longitudinal shaft 1 in the figure faces a rear axle differential in the installed state.

DETAILED DESCRIPTION OF PREFERRED EMBODIMENTS

The gearbox-side shaft segment 2 of the longitudinal shaft 1 ends, on its side facing away from the central articulation 4, in a gearbox-side articulation 5, while the second shaft segment 3 has a differential-side articulation 6 at its end facing away from the central articulation 4. The shaft segments 2 and 3 are configured as sheet-metal tubes, whereby the tube that forms the gearbox-side shaft segment 2 of the longitudinal shaft 1 is connected with the outer hub 7 of the gearbox-side articulation 5, which hub is configured as a shaped sheet-metal part, by way of weld seams 8a, 8b, and is welded to a hollow shaft journal 9 on its side facing the central articulation 4. The tube that forms the differential-side shaft segment 3 of the longitudinal shaft 1 is connected with the outer hub 11 of the central articulation 4, or the outer hub 12 of the differential-side articulation 6, respectively, which are both configured as shaped sheet-metal parts, by way of weld seams 10a and 10b, respectively.

The outside diameter $D_2$ of the gearbox-side shaft segment 2 of the longitudinal shaft 1 is somewhat smaller than the inside diameter $D_3$ of the differential-side shaft segment 3 of the longitudinal shaft 1, so that the two shaft segments 2 and 3 can be pushed into one another in the manner of a telescope.

The gearbox-side articulation 5 as well as the central articulation 4 are sliding articulations, which have, from the outside to the inside, the outer hub 7 or 11, respectively, a cage 13, in which several balls 14 are guided, and an inner hub 15. In this connection, the inner hub is provided with a central bore 16 that has a plug-in tooth system 17 for an integral rotation connection and centering with a correspondingly profiled journal.

Figure 2:
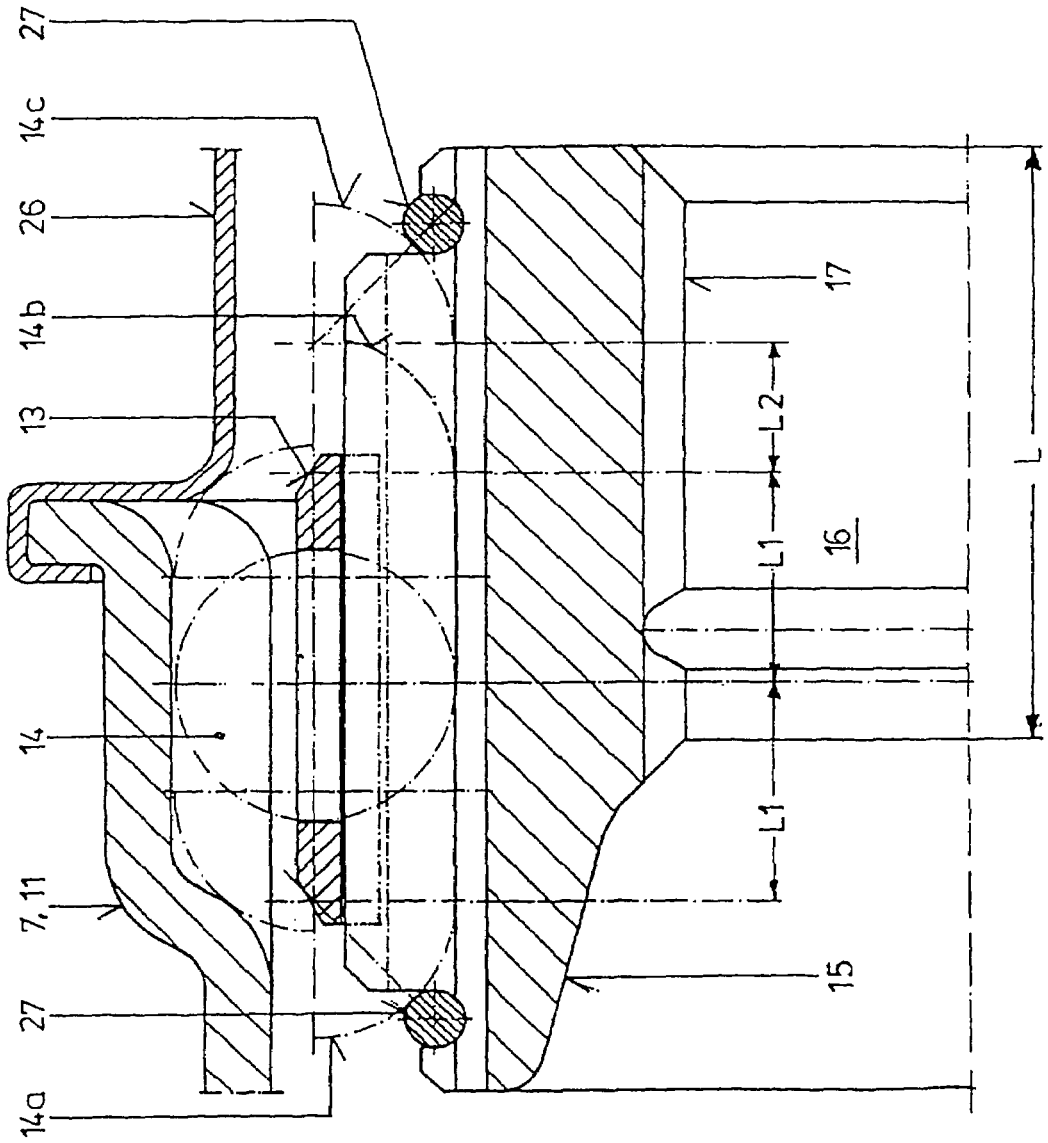
FIG. 2 a detail view of the gearbox-side articulation.

On the outside of the inner hub 15 and the inside of the outer hub 7 or 11, ball raceways that run in the axial direction of the longitudinal shaft 1 are formed, in which the balls 14 guided by the cage 13 can roll or slide, in order to allow an axial displacement between the outer hub 7 or 12 and the inner hub 15. In this connection, as shown in FIG. 2, the cage 13 can be guided to be axially displaceable in the inner hub 15, or can have a cage guide in the outer hub (not shown).

The differential-side articulation 6 of the longitudinal shaft 1 is structured as a counter-path synchronous articulation having a profiled inner hub 18, a cage 20 that guides several balls 19, and the outer hub 12 provided with an insert 21. In this connection, a central bore 22 having a plug-in tooth system 23 for integral rotation accommodation and centering of a correspondingly profiled journal 24 of a differential input shaft is provided in the inner hub 18.

The journal 9 that is connected with the gearbox-side segment 2 of the longitudinal shaft 1 is elastically mounted by way of a ball bearing unit 25. Furthermore, the longitudinal shaft 1 is centered and mounted by means of the gearbox-side and differential-side articulations 5 and 6, respectively, in the inside hubs 15 and 18.

Installation of the longitudinal shaft 1 between the journal of a gearbox output shaft (not shown) and the journal 24 of a differential input shaft takes place, for example, in that first, the inside hub 15 of the gearbox-side articulation 5 is set onto the corresponding journal of the gearbox output shaft. The gearbox-side articulation 5 as well as the central articulation 4, which are both configured as sliding articulations, can be axially displaced from their center operating position of the balls 14, shown in FIG. 2, in both directions, by the length $l_1$, before the balls 14 reach the delimitation predetermined by the outer hub 7 or 11, which delimitations are indicated by the dot-dash lines 14a and 14b. In every sliding articulation, the inner hub can be deflected in both directions, by the length $l_1$, relative to the outer hub, from the position shown in FIG. 2, while the balls 14 are rolling.

In addition, the inner hub 15 can be displaced relative to the outer hub 7 or 11, by the length $l_2$, on the inner hub 15 to the position indicated with 14c in the drawing, while the balls 14 are rolling, when the balls rest against the delimitation stop 26 connected with the outer hub. In this connection, the maximal movement of the balls 14 on the inner hub 15 is limited by means of split rings 27.

The assembly displacement path of the gearbox-side articulation 5 as well as of the central articulation 4, which is composed of the lengths $l_1+l_2$, in each instance, corresponds to at least half of the length L, with which the journal 24 of the differential input shaft projects into the inner hub 18 of the differential-side articulation 6 in operation. The longitudinal shaft 1 can thereby be pushed into itself, in the gearbox-side articulation 5 and the central articulation 4, to such an extent that the inner hub 18 of the differential-side articulation 6 can be oriented in alignment with the journal 24 of the differential input shaft. By means of displacing the inner hubs 15 relative to the outer hubs 7 and 11 in the gearbox-side articulation 5 and the central articulation 4, the inner hub 18 of the differential-side articulation 6 is pushed onto the journal 24 of the differential input shaft. When this is done, the longitudinal shaft 1 is simultaneously centered with the differential input shaft.

The articulations 4, 5, and 6 of the longitudinal shaft 1 can furthermore be sealed and protected against the penetration of dirt, by means of protective sheet metal pieces 28a, 28b, and 28c, as well as by means of folded bellows 29a, 29b, and 29c.

REFERENCE SYMBOL LIST 1 longitudinal shaft
2 gearbox-side segment of the longitudinal shaft 1

3 differential-side segment of the longitudinal shaft 1
4 central articulation
5 gearbox-side articulation
6 differential-side articulation
7 outer hub of the articulation 5
8a, 8b weld seams
9 journal
10a weld seam
10b weld seam
11 outer hub of the articulation 4
12 outer hub of the articulation 6
13 cage of the articulations 4 and 5
14 ball of the articulations 4 and 5
14a displacement position of the ball 14
14b displacement position of the ball 14
14c displacement position of the ball 14
15 inner hub of the articulations 4 and 5, respectively
16 central bore of the inner hub 15
17 plug-in tooth system
18 inner hub of the articulation 6
19 ball of the articulation 6
20 cage of the articulation 6
21 insert
22 bore of the inner hub 18
23 plug-in tooth system of the inner hub 18
24 journal of the differential input shaft
25 ball bearing unit
26 limitation stop
27 split ring
28a protective sheet metal piece
28b protective sheet metal piece
28c protective sheet metal piece
29a folded bellows
29b folded bellows
29c folded bellows

The invention claimed is:

1. A drive shaft assembly having a longitudinal shaft for use in an automobile having all-wheel drive or rear-wheel drive comprising:
   (a) a gearbox-side articulation comprising a first homokinetic ball joint, said gearbox-side articulation having a first inner hub, a first outer hub at least partly surrounding the first inner hub and a first cage for guiding a first plurality of balls, the first inner hub and the first outer hub having respective first ball raceways wherein the first plurality of balls is guided in the respective first ball raceways for transmitting a first torque between the first inner hub and the first outer hub;
   (b) a differential-side articulation comprising a second homokinetic ball joint, said differential-side articulation having a second inner hub, a second outer hub at least partly surrounding the second inner hub and a second cage for guiding a second plurality of balls, the second inner hub and the second outer hub having respective second ball raceways wherein the second plurality of balls is guided in the respective second ball raceways for transmitting a second torque between the second inner hub and the second outer hub;
   (c) a central articulation having a third inner hub, a third outer hub at least partly surrounding the third inner hub at least in some regions and a third cage for guiding a third plurality of balls, the third inner hub and the third outer hub having respective third ball raceways wherein the third plurality of balls is guided in the respective third ball raceways for transmitting a third torque between the third inner hub and the third outer hub; and
   (d) first and second shaft segments connected with one another so as to rotate together by way of said central articulation;
   wherein a journal of a gearbox output shaft having a plug-in tooth system is directly connected to the first inner hub and a journal of a differential input shaft having a plug-in tooth system is directly connected to the second inner hub, and
   wherein each of said first and second inner hubs has a respective central bore provided with a plug-in connection to connect the longitudinal shaft for integral rotation and to center the longitudinal shaft on the journals of the gearbox output shaft and the differential input shaft, respectively.

2. The drive shaft assembly as recited in claim 1, wherein the third inner hub has a central bore that is provided with a plug-in tooth system, which accommodates a journal of the first shaft segment for plug-in centering for integral rotation.

3. The drive shaft assembly as recited in claim 1, wherein the first and second shaft segments of the longitudinal shaft are configured as shaft tubes, and the first, second, and third outer hubs are shaped sheet-metal parts directly connected with the shaft tubes.

4. The longitudinal shaft as recited in claim 1, wherein the gearbox-side articulation and/or the central articulation are sliding articulations.

5. The drive shaft assembly as recited in claim 1, wherein the differential-side articulation is a synchronous articulation.

6. The drive shaft assembly as recited in claim 1, wherein the first shaft segment is a gearbox-side shaft segment and the second shaft segment is a differential-side shaft segment, said first shaft segment having a diameter that deviates from a diameter of the second shaft segment, in such a manner that the two shaft segments of the longitudinal shaft can be pushed onto one another in the manner of a telescope.

7. A drive shaft assembly having a longitudinal shaft for use in an automobile having all-wheel drive or rear-wheel drive comprising:
   (a) a gearbox-side articulation comprising a first homokinetic ball joint, said gearbox-side articulation having a first inner hub, a first outer hub at least partly surrounding the first inner hub and a first cage for guiding a first plurality of balls, the first inner hub and the first outer hub having respective first ball raceways wherein the first plurality of balls is guided in the respective first ball raceways for transmitting a first torque between the first inner hub and the first outer hub;
   (b) a differential-side articulation comprising a second homokinetic ball joint, said differential-side articulation having a second inner hub, a second outer hub at least partly surrounding the second inner hub and a second cage for guiding a second plurality of balls, the second inner hub and the second outer hub having respective second ball raceways wherein the second plurality of balls is guided in the respective second ball raceways for transmitting a second torque between the second inner hub and the second outer hub;
   (c) a central articulation having a third inner hub, a third outer hub at least partly surrounding the third inner hub at least in some regions and a third cage for guiding a third plurality of balls, the third inner hub and the third outer hub having respective third ball raceways wherein the third plurality of balls is guided in the respective third ball raceways for transmitting a third torque between the third inner hub and the third outer hub; and (d) first and second shaft segments connected with one another so as to rotate together by way of said central articulation;

wherein a journal of a gearbox output shaft having a plug-in tooth system is directly connected to the first inner hub and a journal of a differential input shaft having a plug-in tooth system is directly connected to the second inner hub, and wherein each of said first and second inner hubs has a respective central bore provided with a plug-in connection to connect the longitudinal shaft for integral rotation and to center the longitudinal shaft on the journals of the gearbox output shaft and the differential input shaft, respectively and wherein the gearbox-side articulation and/or the central articulation are sliding articulations and wherein the sliding articulations together have an assembly displacement path, which corresponds to at least a length, with which the gearbox output shaft or the differential input shaft projects into the first or second inner hub in operation.

* * * * *

UNITED STATES PATENT AND TRADEMARK OFFICE
CERTIFICATE OF CORRECTION

| | | |
|---|---|---|
| PATENT NO. | : 7,582,021 B2 | Page 1 of 1 |
| APPLICATION NO. | : 10/524391 | |
| DATED | : September 1, 2009 | |
| INVENTOR(S) | : Werner Jacob | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

Signed and Sealed this

Fourteenth Day of September, 2010

David J. Kappos
*Director of the United States Patent and Trademark Office*